(No Model.)
F. W. BERNING.
GATE.
No. 382,068. Patented May 1, 1888.
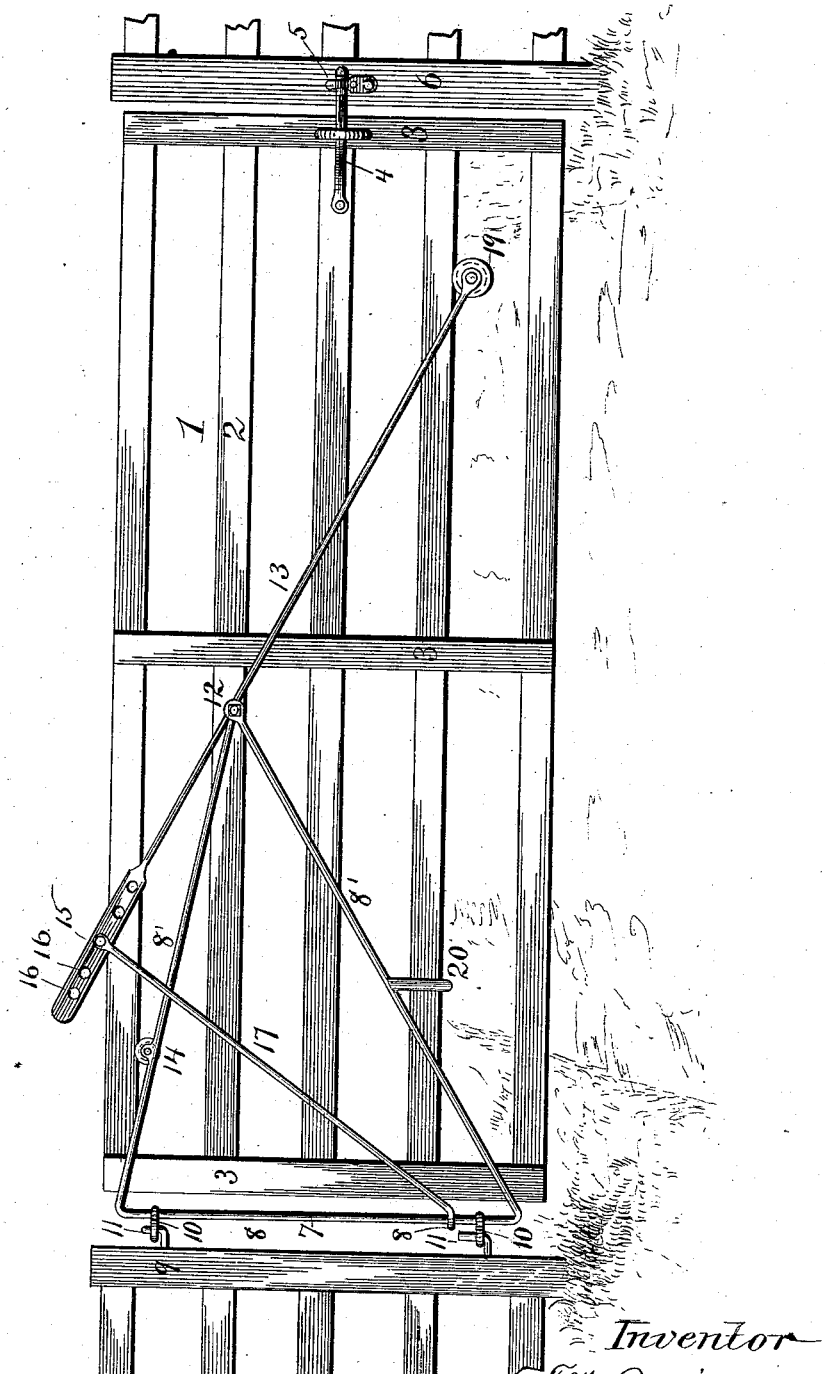
Witnesses
J. C. Kemon
J. Middleton
Inventor
F. W. Berning
BY Munn & Co
Attorneys

UNITED STATES PATENT OFFICE.

FRANK WM. BERNING, OF OTTAWA, OHIO.

GATE.

SPECIFICATION forming part of Letters Patent No. 382,068, dated May 1, 1888.

Application filed October 17, 1887. Serial No. 252,601. (No model.)

*To all whom it may concern:*

Be it known that I, FRANK WILLIAM BERNING, of Ottawa, in the county of Putnam and State of Ohio, have invented a new and Improved Gate, of which the following is a full, clear, and exact description.

This invention relates to that class of gates which are adapted to swing or slide, and has for its object to provide such a gate which shall be so constructed that it can be swung inwardly or outwardly, and slid back and forth, and will be properly supported.

The drawing illustrates the gate in closed position.

The gate 1 is constructed in the usual manner with bars 2, connected by cross strips 3, and has a suitable latch, 4, engaging a catch, 5, on the adjacent post 6. It is mounted on a frame, 7, of iron rods or other suitable material, formed with the vertical side 8 and inclined sides 8', and suspended on the post 9 by means of sockets 10 engaging hooks 11. The outer pointed end of the frame 7 has pivoted thereto, as at 12, an inclined bar or rod, 13, which has a grooved roller, 19, at its lower forward end, upon which one of the lower bars, 2, is adapted to move, and is formed at its other end with a flattened part, 15, having perforations 16, with which the bent end of a bar or rod, 17, is adapted to engage, said bar being pivoted to the side 8 of frame 7.

By adjusting the bent end of rod 17 in the holes 16 the gate may be raised and held up in winter to clear the snow. The frame 7 is provided with a grooved roller, 14, on which the upper bar, 2, is adapted to move, and also with a hook, 20, in which a bar, 2, is adapted to move and which serves to steady the gate 1.

It will be seen that by the construction shown and described the gate 1 upon releasing latch 4 may be slid back upon rollers 14 and 19 until the latter is brought against the strip 3. To use it as a swinging gate it is only necessary to slide it back sufficiently to have latch 4 clear post 6.

By means of the relative position of rollers 14 19 and the arrangement of frame 7 and rod 13 the gate is properly supported at all times in its movement and can be easily operated.

The gate is strong and durable, is easily operated, and readily adapted to act as a sliding or swinging gate.

Having thus described my invention, what I claim as new, and desire to secure by Letters Patent, is—

1. The combination, with a sliding gate and a hinged frame upon which the gate is supported, of a bar pivoted on the free end of the said frame, and having its lower end engaging one of the bars of the gate, and means for locking the said bar in different positions, substantially as described.

2. The combination, with a sliding gate and a hinged frame upon which the gate is supported, of a bar pivoted to the free end of the said frame and having its lower end engaging one of the bars of the gate, and a rod secured to the said hinged frame and having its free end adjustably connected to the upper end of the pivoted bar, substantially as described.

3. A support for a sliding gate, consisting of the triangular frame 7, provided with sockets or eyes 10 for hinging the same, and with the roller 14 and hook 20 for engaging the bars of the gate, the bar 13, pivoted to the pointed end of the frame and provided with a roller, 19, and perforations 16, and the rod 17, secured to the frame 7 and engaging one of the perforations in the bar 13, substantially as herein shown and described.

FRANK WM. BERNING.

Witnesses:
JOS. UNTERBRINK,
PHILIP KORNEN.